United States Patent
He et al.

(10) Patent No.: US 10,904,378 B2
(45) Date of Patent: *Jan. 26, 2021

(54) IMMEDIATE-MODE CAMERA FOR PORTABLE PERSONAL ELECTRONIC DEVICES

(71) Applicant: Shenzhen Goodix Technology Co., Ltd., Shenzhen (CN)

(72) Inventors: Yi He, San Diego, CA (US); Bo Pi, San Diego, CA (US)

(73) Assignee: Shenzhen Goodix Technology Co., Ltd, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/746,984

(22) Filed: Jan. 20, 2020

(65) Prior Publication Data

US 2020/0412863 A1 Dec. 31, 2020

Related U.S. Application Data

(63) Continuation of application No. 16/454,208, filed on Jun. 27, 2019, now Pat. No. 10,594,856.

(51) Int. Cl.
*H04M 1/00* (2006.01)
*H04B 1/38* (2015.01)
*H04M 1/725* (2006.01)

(52) U.S. Cl.
CPC ..... *H04M 1/7258* (2013.01); *H04M 1/72522* (2013.01)

(58) Field of Classification Search
CPC ............. H04N 5/2257; H04N 5/23202; H04N 5/23206; H04N 5/23229; H04N 7/147;
(Continued)

(56) References Cited

U.S. PATENT DOCUMENTS 8,341,557 B2   12/2012   Pisula et al.
9,532,198 B2 * 12/2016   Mannan ................. H04W 4/16
(Continued)

FOREIGN PATENT DOCUMENTS

CN   103024258 A   4/2013
CN   105739786 A   7/2016
(Continued)

*Primary Examiner* — Quochien B Vuong
(74) *Attorney, Agent, or Firm* — Kilpatrick Townsend & Stockton LLP

(57) ABSTRACT

Techniques are described for implementing an immediate-mode camera for integration into portable personal electronic device (PPED) environments. Embodiments of the IMC can include an integrated digital camera that can be triggered directly by one or more user interface components, without involving waking up the application processor, waking up display components, waking up digital camera components, and/or starting up camera-related applications. For example, if a user's smart phone is locked, and the user desired to capture a photo, the user can interact with particular UI components in a particular manner, thereby directly triggering capture of image data by the IMC substantially without delay. Implementations of the IMC can involve a low-power, always-on digital camera that is directly controllable by one or more always-on user interface components. The IMC components can be in communication with an always-on region of the application processor via a fast hardware interface.

19 Claims, 7 Drawing Sheets

(58) Field of Classification Search
CPC ........ H04N 7/181; H04N 7/185; H04N 7/188;
H04N 21/4223; H04N 21/44218; H04N
2201/0084; H04W 24/02; H04M 1/73;
H04M 2250/12; H04M 2250/52; H04B
5/0037; H04B 5/0075; H04B 10/114;
H04B 10/116; H04B 10/516
See application file for complete search history.

(56) References Cited

U.S. PATENT DOCUMENTS

| | | | |
|---|---|---|---|
| 10,028,227 B2* | 7/2018 | Kim | G06K 9/00241 |
| 10,142,825 B2* | 11/2018 | Koike | H04W 76/14 |
| 10,375,219 B2* | 8/2019 | Kim | G06K 9/00288 |
| 2004/0201775 A1* | 10/2004 | Brake | H04N 5/232 |
| | | | 348/375 |
| 2010/0060586 A1 | 3/2010 | Anzures et al. | |
| 2012/0140085 A1* | 6/2012 | Gallinat | H04N 21/42203 |
| | | | 348/207.1 |
| 2013/0044097 A1 | 2/2013 | Ban et al. | |
| 2017/0364010 A1* | 12/2017 | Ogawara | G03G 15/1675 |

FOREIGN PATENT DOCUMENTS

| | | |
|---|---|---|
| CN | 106843578 A | 6/2017 |
| CN | 108270962 A | 7/2018 |

* cited by examiner

IMMEDIATE-MODE CAMERA FOR PORTABLE PERSONAL ELECTRONIC DEVICES

REFERENCES TO RELATED APPLICATIONS

This application is a Continuation of U.S. application Ser. No. 16/454,208, for "IMMEDIATE-MODE CAMERA FOR PORTABLE PERSONAL ELECTRONIC DEVICES" filed on Jun. 27, 2019, which is hereby incorporated by reference in its entirety for all purposes.

FIELD

The invention relates generally to cameras integrated into personal electronic devices. More particularly, embodiments relate to an immediate-mode camera for integration into portable personal electronic device environments.

BACKGROUND

In the past, photography was a discipline reserved to those with specialized knowledge and equipment. Over the past decades, innovations in digital photographic hardware and software, and the worldwide spread of smartphones with integrated digital cameras, have placed digital photography at the fingertips of billions of consumers. In this environment of ubiquitous access to digital photography and videography, consumers increasingly desire to be able to quickly and easily capture moments using their smartphones. However, the camera, and other components of the smartphone (e.g., display hardware, illumination hardware, etc.) can consume appreciable power if left in an active mode, which can appreciably reduce battery life and have other undesirable effects. As such, smartphones (and some or all of their higher power components) are typically kept in a sleep mode when not in use. For example, smartphones often are kept in a locked state, and most or all functions of the smartphone can only be accessed after unlocking the smartphone.

When the smartphone is locked, and a consumer desires to capture a photo or video, the consumer typically presses a button, or interacts with another interface, to unlock the smartphone. This wakes up certain component resources, such as the smartphone display. A user interface of the smartphone can be used to access a camera application. When the camera application starts, the application can access and wake up various camera-related component resources, such as camera and illumination hardware and software. After the camera-related component resources are ready, the consumer can interact again with user interface elements to trigger the camera to capture a photo or video. For many typical smartphone, there can be a delay of a couple to a few seconds between the time the smartphone is unlocked and the time when a photo can be captured by the smartphone. In some situations, such a delay is too long. For example, a particular moment may have passed without time to capture it. Thus, while maintaining the camera in a sleep mode when not in use can help to appreciably increase battery life of the smartphone, accessing and waking the camera from the sleep mode can add appreciable delay to use of the camera.

BRIEF SUMMARY OF THE INVENTION

Embodiments provide circuits, devices, and methods for implementing an immediate-mode camera for integration into portable personal electronic device (PPED) environments. Embodiments of the IMC can include an integrated digital camera that can be triggered directly by one or more user interface components, without involving waking up the application processor, waking up display components, waking up digital camera components, and/or starting up camera-related applications. For example, if a user's smart phone is locked, and the user desired to capture a photo, the user can interact with particular UI components in a particular manner, thereby directly triggering capture of image data by the IMC substantially without delay. Implementations of the IMC can involve a low-power, always-on digital camera that is directly controllable by one or more always-on user interface components. The IMC components can be in communication with an always-on region of the application processor via a fast hardware interface.

According to one set of embodiments, a portable personal electronic device (PPED) is provided for immediate-mode digital image capture. The PPED includes: an application processor configured selectively to operate in a sleep mode or an active mode, the application processor having an always-on region that remains active when the application processor is in the sleep mode; a plurality of user interface components having one or more always-on user interface components, at least one of the one or more always-on user interface components being an IMC trigger component; and an immediate-mode camera (IMC) system having a digital camera assembly controlled by an IMC controller, the IMC controller coupled with and responsive to the IMC trigger component. The IMC controller is configured to: detect an interaction with the IMC trigger component; trigger, in response to detecting the interaction, capture of image data by the digital camera assembly; pretreat the image data to generate pretreated image signals; and communicate the pretreated image signals via an interface bus to the always-on region of the application processor.

According to another set of embodiments, a method is provided for immediate-mode digital image capture. The method includes: detecting, by an immediate-mode camera (IMC) controller of an IMC system integrated into a portable personal electronic device (PPED), an interaction with an IMC trigger component coupled with the IMC controller, the IMC trigger component being one of a set of always-on user interface components integrated into the PPED; triggering, by the IMC controller, in response to the interaction, capture of image data by a digital camera of the IMC system; pretreating the image data by the IMC controller to generate pretreated image signals; and communicating the pretreated image signals via an interface bus to an always-on region of an application processor integrated into the PPED.

BRIEF DESCRIPTION OF THE DRAWINGS

The accompanying drawings, referred to herein and constituting a part hereof, illustrate embodiments of the disclosure. The drawings together with the description serve to explain the principles of the invention.

Figure 1A:
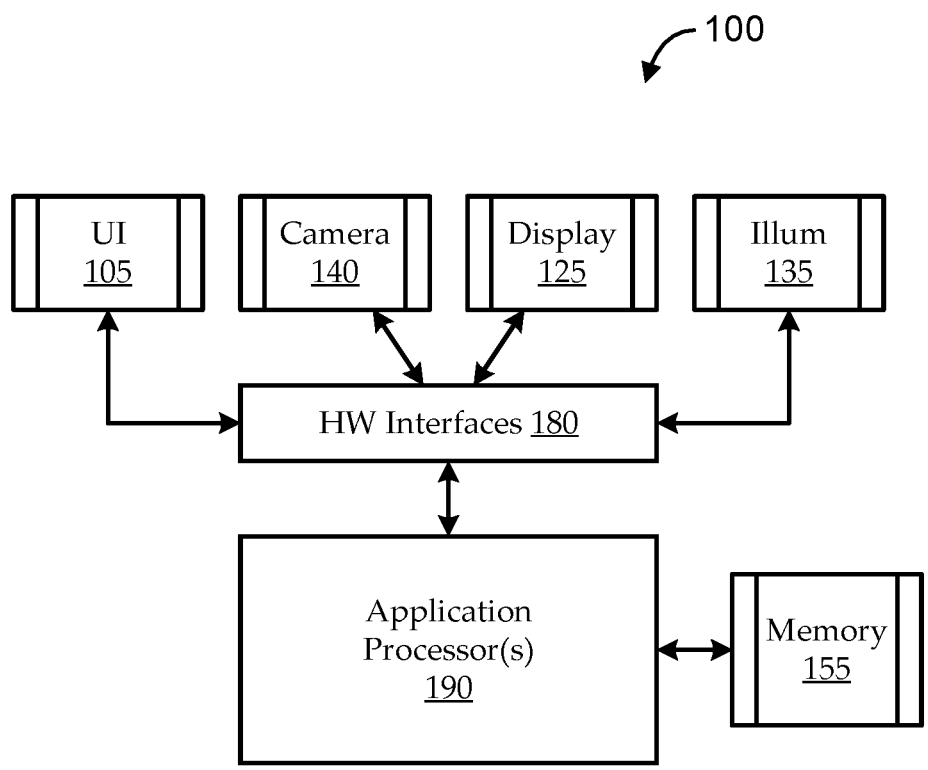
FIG. 1A shows a simplified block diagram of a partial conventional portable personal electronic device (PPED) architecture 100.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION OF THE INVENTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

It has become increasingly common for portable personal electronic devices (PPEDs) to have various integrated hardware components that consume relatively large amounts of power when in operation, such as one or more large displays, digital cameras, and illumination components. To save power and extend battery life, such PPEDs typically switch into a sleep mode, in which the more power-hungry components are either turned off completely or are set to a low-power mode (e.g., standby power mode, or the like). As used herein, a PPED can include a smartphone, tablet computer, laptop computer, smart wearable device (e.g., a smartwatch), or any other suitable device that has one or more digital cameras integrated therein. For example, when a conventional smartphone is "locked," its camera (or each of its cameras) is effectively turned off. From that state, accessing the camera to take a picture conventionally involves waking up the main processor (e.g., by unlocking the smartphone) and accessing a camera application, which triggers the camera also to wake up and prepare its subsystems (e.g., focus, illumination, etc.) for capture of images or video.

As used herein, a PPED can include a smartphone, tablet computer, laptop computer, smart wearable device (e.g., a smartwatch), or any other suitable device that has one or more digital cameras integrated therein. It is assumed herein that a PPED can be set to a sleep mode. Different types of PPEDs can be set thus in different ways, such as by using hardware and/or software controls to lock the PPED, to set the PPED to "hibernate" or "sleep," etc. As used herein, phrases like "locking," setting or putting in "locked" mode, setting or putting in "sleep" mode, or the like are intended generally and interchangeably to refer to placing the PPED, or one or more components of the PPED, in a mode in which one or more conventionally higher-power components (e.g., main application processor 190, digital camera components 140, display components 125, etc.) are set to consume little or no power, such as standby power. Similarly, as used herein, phrases like "unlocking," setting or putting in "unlocked" mode, "waking," or the like are intended generally and interchangeably to refer to returning the PPED, or one or more components of the PPED, to a mode in which the one or more conventionally higher-power components are permitted to operate in their conventionally higher-power manner.

For added context, FIG. 1A shows a simplified block diagram of a partial conventional portable personal electronic device (PPED) architecture 100. As illustrated, such a conventional PPED can include multiple hardware components, such as hardware user interface (UI) components 105, digital camera components 140, display components 125, and illumination components 135. For example, the UI components 105 can include physical buttons and switches, touch-sensitive components (e.g., capacitive features) of a touchscreen, force sensor components, optical sensor components, etc.; digital camera components 140 can include charge-coupled devices (CCDs), lenses, etc.; display components 125 can include one or more display screens, etc.; and illumination components 135 can include light-emitting diodes, etc. The hardware components can also include memory 155, which can be implemented as one or more integrated memory hardware devices (e.g., removable and/or non-removable solid-state memory circuits, etc.).

The conventional PPED can also include an application processor 190, which can be in communication with the hardware components via one or more hardware interfaces 180. The application processor 190 can be implemented as any suitable processor or processors, such as a microcontroller unit (MCU), general-purpose processor, etc. The application processor 190 can execute operating system functions, kernel functions, application-related functions, and any other suitable functions. Such functions can be used to control and/or respond to operations of the hardware components. For example, outputting images to the display 125 can involve the application processor 190 requesting system resources (e.g., memory resources) to allocate to the display, converting application-level commands to hardware-level commands, etc.

Conventionally, when a PPED is locked, certain portions of the application processor 190 and certain lower-power hardware components can continue to operate. Such components and functions that continue to operate while the PPED is locked are referred to herein as "always-on" components or functions. Though referred to as "always-on," such components or functions can be turned off in certain circumstances, for example, by fully powering down the PPED, by removing a battery, etc. In some PPEDs, options may be provided to permit selective shutting down of some or all "always-on" functions or components using hardware, software, etc. It is typical, however, for certain types of PPEDs to be kept in locked mode when not in use, as opposed to being fully shut down. For example, when a smartphone is locked, it can still typically receive phone calls, receive push notifications from applications, and detect user interactions involved in unlocking the smartphone. As such, when the smartphone is locked, the application processor 190 may be set to standby power mode, or the like, in which the application processor 190 draws a minimum amount of power to maintain operation of only its "always-on" functions; and low-power components (e.g., a fingerprint sensor, home key, or the like) can be maintained in an always-on state to facilitate detection of unlocking interactions.

The digital camera components 140 are conventionally not always-on components, as they tend to consume appreciable power and tend to be controlled at the application layer by one or more camera-related applications running on the application processor 190. As such, as described above, when the PPED is locked, the digital camera components 140 are typically in a sleep mode (e.g., turned off). Thus, accessing the camera from sleep mode can involve waking the application processor 190, accessing one or more applications, and waking digital camera components 140 (e.g., and typically also waking the display components 125 for viewfinder use, waking the illumination components 135 for lighting, etc.).

Figure 1B:
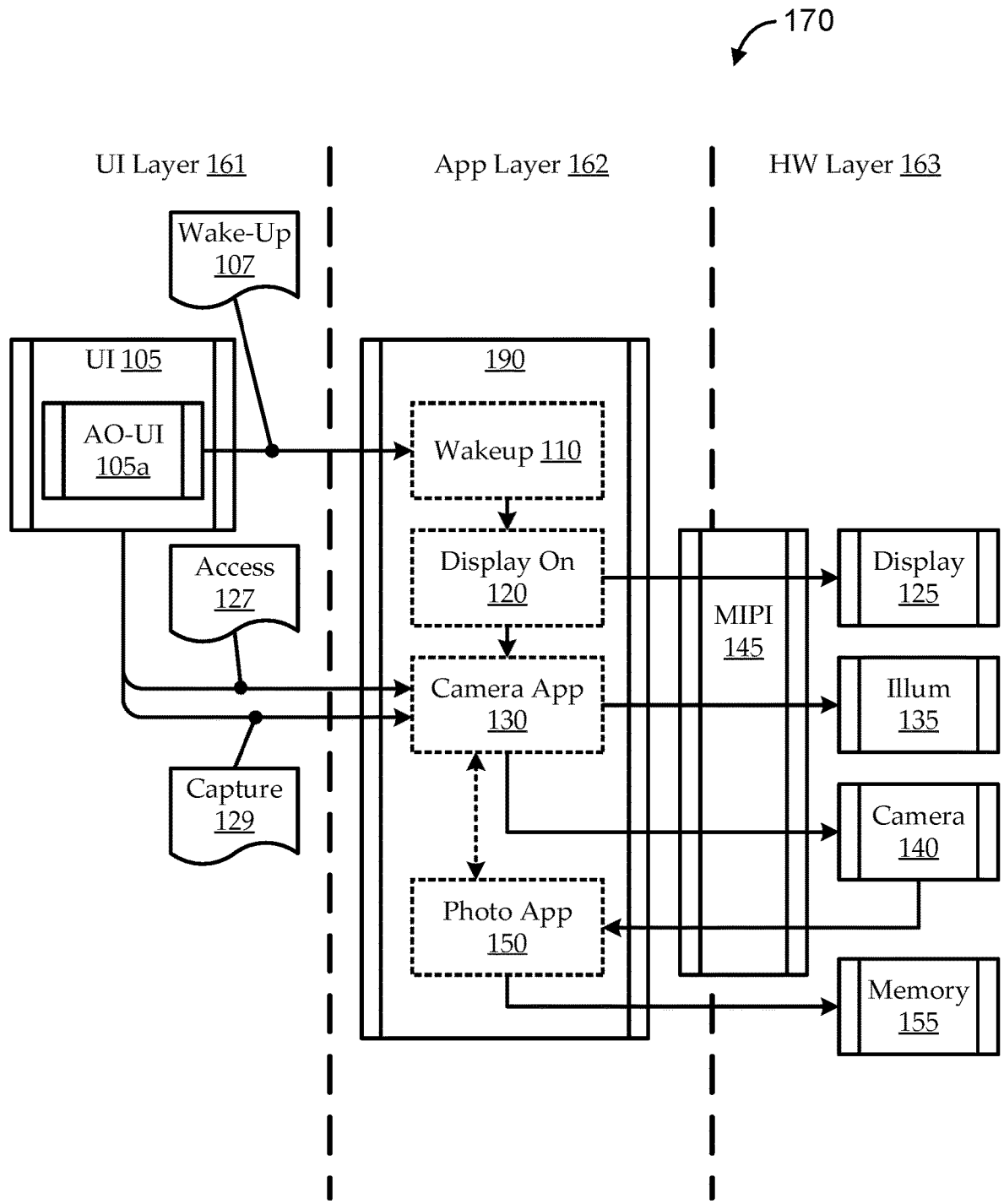
FIG. 1B shows a flow diagram of an illustrative conventional routine for transitioning a PPED from sleep mode to being able to capture a photo on an integrated digital camera.

FIG. 1B shows a flow diagram 170 of an illustrative conventional routine for transitioning a PPED from sleep mode to being able to capture a photo on an integrated digital camera. For added clarity, the flow diagram 170 is segregated into a user interface layer 161, an application layer 162, and a hardware layer 163. The user interface layer 161 includes portions of the flow diagram 170 involving user interactions with hardware UI components 105. The application layer 162 includes portions of the flow diagram 170 performed by the application processor 190 (e.g., executable by application software). The hardware layer 163 includes portions of the flow diagram 170 performed by hardware components other than the UI components 105 and the application processor 190, such as by the display components 125, the illumination components 135, the digital camera components 140, and the memory 155. As illustrated, in many conventional PPEDs, some or all of the hardware components are in communication with the application processor 190 via one or more hardware interfaces 180 configured according to a Mobile Industry Processor Interface (MIPI) specification (shown as a MIPI interface 145). For example, the digital camera components 140 can be in communication with the application processor 190 via a MIPI Camera Serial Interface (MIPI CSI), the display components 125 can be in communication with the application processor 190 via a MIPI Display Serial Interface (MIPI DSI), etc.

It is assumed that the flow diagram 170 begins when the PPED is locked, such that the digital camera components 140 (e.g., and other not-always-on hardware components) are powered down, powered off, or otherwise in sleep mode. As such, the flow diagram 170 begins with an interaction captured by an always-on component, resulting in a "wakeup" signal 107. To that end, a portion of the UI components 105 are shown as always-on UI (AO-UI) components 105a. For example, the AO-UI components 105a can include a button, fingerprint sensor, or other low-power component configured to trigger the PPED to wake up in response to detecting certain interactions. A user interaction with one of the AO-UI components 105a generates the wakeup signal 107, which can trigger a wakeup routine 110.

The wakeup routine 110 can involve any suitable commands to wake up the PPED, for example, beginning with commencing wakeup of the application processor 190. Typically, the wakeup routine 110 can also trigger a display on routine 120, by which the application processor 190 can direct the display components 125 to turn on, switch from a lock screen to a home screen, and/or otherwise enter an operational mode for use by the user. In some conventional PPED environments, a camera application 130 is accessible via one or more UI components 105 after the display components 125 are turned on. For example, a number of icons are displayed by the display components 125 for selection by the user, including a particular icon associated with the camera application 130. User interaction with the particular icon, for example, by interfacing with a touchscreen, navigation buttons, and/or other UI components 105, generates an access signal 127 for accessing the camera application 130.

Receipt of the access signal 127 by the application processor 190 can cause the camera application 130 to execute (e.g., to open). Execution of the camera application 130 can trigger the digital camera components 140 to wake up (e.g., to power on, initialize, etc.). In some cases, the camera application 130 can trigger one or more other systems to wake up, such as certain illumination components 135 (e.g., for providing flash and/or other illumination to support image or video capture), certain sensor components (e.g., for automatic stabilization), certain UI components 105 (e.g., any buttons or other interfaces used only for camera interactions), etc. The digital camera components 140 may finally be used to capture image data (e.g., for photos and/or videos) after the digital camera components 140 have been woken up (e.g., and, in some cases, only after waking up of any other components used by the camera application). To take a photo or video, a user can typically interface with one or more UI components 105 to generate a capture signal 129. Receipt of the capture signal 129 by the application processor 190 can cause the camera application 130 to direct the digital camera components 140 (and any other supporting components) to capture image data. The captured image data may be pre-treated for communication to other applications via the MIPI interface 145. For example, pre-treated image data signals can be sent to a photo application 150 running on the application processor 190. The photo application 150 may generate photo previews, interface with a photo storage and/or retrieval in the memory 155, and/or provide other photo-related functions.

As described above, the digital camera components 140 conventionally integrated into PPEDs consume appreciable amounts of power, and the digital camera components 140 are turned off when the PPED is locked to save power (i.e., the digital camera components 140 are not conventionally implemented as always-on components). However, as illustrated by the flow diagram 170 of FIG. 1B, accessing the camera from sleep mode conventionally involves a number of stages, including waking and executing multiple hardware and software components. This can often take multiple seconds (e.g., 1.5-3.5 seconds for many conventional smartphones, depending on processor speeds, camera resolution, and/or other specifications of the smartphones). Such a delay can be undesirably long for certain applications, such as when a user desires to quickly capture a fleeting moment.

Some conventional PPEDs include a wakeup-to-camera mode, which automatically accesses the camera application 130 along with unlocking the PPED. A particular interaction with an AO-UI component 105a of the PPED while locked (e.g., swiping a finger across the lock screen along a particular path, rotating the locked PPED back and forth in a particular manner, etc.) causes the PPED to wake up and proceed automatically waking up the camera. For example, such a particular interaction generates both the wakeup signal 107 and the access signal 127, thereby triggering the wakeup routine 110, the display-on routine 120, and start-up of the camera application 130; which in turn triggers wakeup of the display components 125, the illumination components 135, and the digital camera components 140. While such a wakeup-to-camera mode can be faster than waiting for manual accessing of the camera application 130 by the user, the wakeup-to-camera mode still involves the other portions of the flow diagram 170 (e.g., waking up the application processor 190, waking up the display components 125, starting up the camera application 130, waking up the digital camera components 140, etc.). As such, even with the wakeup-to-camera mode, there can still be an appreciable delay between the user's initial wakeup interaction with the PPED, and the digital camera components 140 being ready for capturing photos or videos.

Embodiments described herein include a novel immediate-mode camera (IMC) for integration in a PPED. Embodiments of the IMC can include an integrated digital camera that can be triggered directly by one or more user interface components, without involving waking up the application processor, waking up display components, waking up digital camera components, and/or starting up camera-related applications. For example, if a user's smart phone is locked, and the user desired to capture a photo, the user can interact with particular UI components in a particular manner, thereby directly triggering capture of image data by the IMC substantially without delay. Implementations of the IMC can involve a low-power, always-on digital camera that is directly controllable by one or more always-on user interface components. The IMC components can be in communication with an always-on region of the application processor via a fast hardware interface.

Figure 2A:
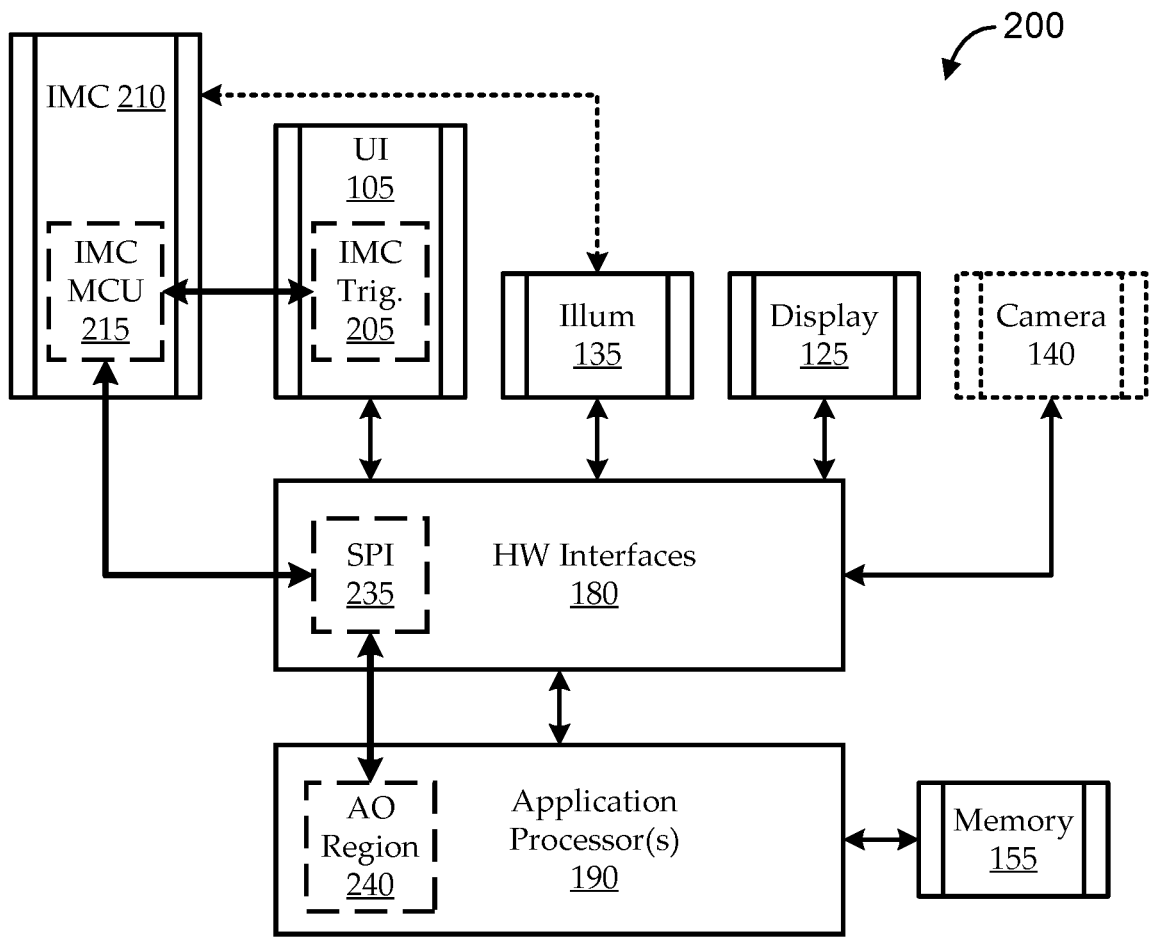
FIG. 2A shows a block diagram of a partial novel PPED architecture having an integrated immediate-mode camera (IMC), according to various embodiments.

FIG. 2A shows a block diagram of a partial novel PPED architecture 200 having an integrated immediate-mode camera 210, according to various embodiments. As illustrated, the novel PPED architecture 200 can include multiple hardware components, such as hardware user interface (UI) components 105 (including one or more always-on UI components 105a), display components 125, and illumination components 135. The novel PPED architecture 200 also includes an immediate-mode camera (IMC) system 210. The IMC system 210 can include an integrated IMC microcontroller unit (IMC MCU) 215, which can be directly controlled by one or more of the always-on UI components 105a. Embodiments of the IMC system 210 can include an integrated IMC microcontroller unit (IMC MCU) 215, which can be directly controlled by one or more of always-on components of the UI components 105. The particular always-on components configured to directly control the IMC MCU 215 are illustrated as one or more IMC trigger components 205. Some such novel PPED architectures 200 also include one or more conventional digital camera components 140 (e.g., to operate as separate digital cameras of the PPED, not operable as immediate-mode cameras).

Embodiments of the IMC system 210 can be implemented as a low-power digital camera, such that the digital camera components can be always-on components. The IMC system 210 includes one or more digital camera assemblies. Embodiments of the digital camera assembly (or assemblies) can include any suitable components. For example, a photodetector is positioned substantially at a focal plane of an imaging lens, such that the imaging lens forms an image of an object at the surface of the photodetector. The photodetector can convert optical signals of the image into electrical signals using, for example, a photodiode array, a charged coupled device (CCD), a complementary metal oxide semiconductor (CMOS) sensor, and/or any other suitable component.

Some embodiments of the IMC system 210 are packaged with a small opening window that can be integrated into a frame of a display screen of the PPED 300, or in any other suitable location. The IMC system 210 camera can be in place of, or in addition to, one or more other digital cameras of the PPED 300. In some implementations, the IMC system 210 includes multiple camera assemblies. Some embodiments of the IMC system 210 include, or are configured to directly control, one or more of the illumination components 135. In one implementation, the IMC system 210 includes one or more illumination light sources positioned in proximity to an aperture of the digital camera. The illumination light source(s) can provide illumination at one or more wavelengths, such as in an optical wavelength (e.g., to provide illumination in a dark environment), in an infrared wavelength (e.g., at about 940 nm wavelength, or other eye-safe wavelength), etc.

The PPED architecture 200 can also include an application processor 190. The application processor 190 can be implemented as any suitable processor or processors. As illustrated, embodiments of the application processor 190 can include an always-on region 240. When the PPED is locked, the AO region 240 stays on (e.g., consuming relatively low power) to maintain operation of certain background functions. For example, while the PPED is locked, the AO region 240 of the application processor 190 can continue to monitor for user interactions with always-on UI components 105, including IMC trigger components 205, to detect wake-up interactions, IMC-related interactions, etc. In some embodiments, the AO region 240 of the application processor 190 is implemented in a trusted execution environment (TEE) 240.

Embodiments of the application processor 190 can be in communication with the hardware components (including the IMC system 210) via one or more hardware interfaces 180. As described above with reference to a conventional PPED, some of the hardware components can be in communication with the application processor 190 via a MIPI interface. For example, the conventional digital camera components 140 can be in communication with the application processor 190 via a MIPI CSI, the display components 125 can be in communication with the application processor 190 via a MIPI DSI, etc. The MIPI interface, and other similar interfaces, facilitate use of the application processor 190 as a so-called "host processor" of the hardware component. For example, a conventional integrated digital camera does not have its own microcontroller; instead, operation of the digital camera relies on the application processor 190 as its host processor and on communications with the application processor 190 via an appropriate interface, such as a MIPI interface. While such implementations provide a number of desirable features, MIPI-types of interfaces can be slow relative to other types of interfaces, such as processor-to-processor, bus-type interfaces. In some embodiments, the IMC system 210 is in communication with the application processor 190 via a such a faster bus-type interface, such as a Serial Peripheral Interface (SPI) 235. The SPI 235 can operate as a communication interface bus coupled between the application processor 190 and the IMC system 210 to enable rapid synchronous serial communications, for example, between the AO region 240 of the application processor 190 and the IMC MCU 215 of the IMC system 210.

As described further herein, a user interaction with an IMC trigger component 205 can directly control the IMC MCU 215 to cause the IMC system 210 to capture image data. The captured image data can be pretreated by the IMC system 210 and sent, via the SPI 235, to the AO region 240 of the application processor 190. Thus, photos and/or videos can be captured by the IMC system 210 of the PPED without waiting for (e.g., and, in some cases, without even triggering) waking of the application processor 190, waking of display components 125, waking of conventional digital camera components 140, starting up of applications, etc.

Figure 2B:
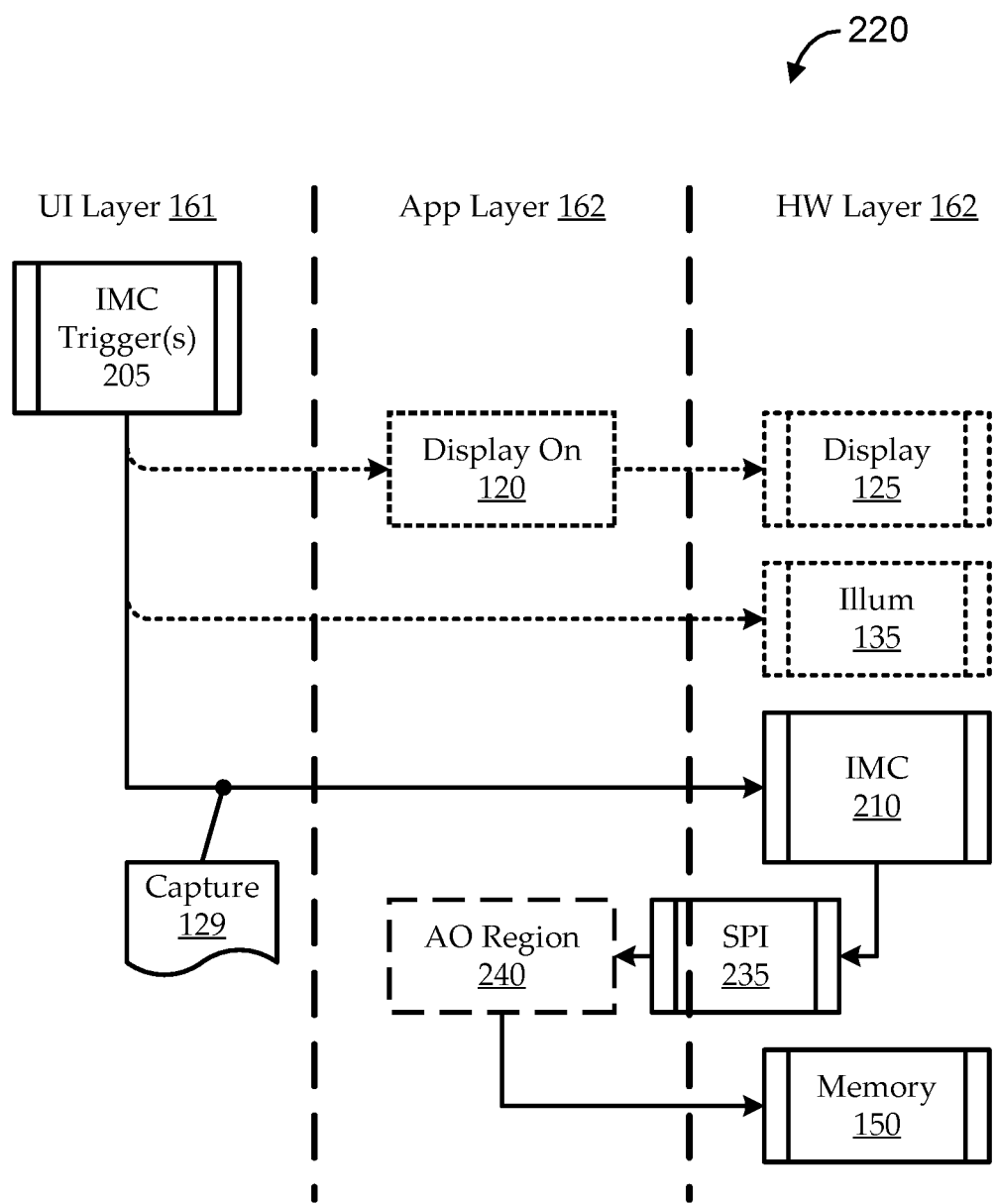
FIG. 2B shows a flow diagram of an illustrative routine for transitioning the novel PPED of FIG. 2A from sleep mode to being able to capture a image data using an IMC system, according to various embodiments.

FIG. 2B shows a flow diagram 220 of an illustrative routine for transitioning the novel PPED 200 of FIG. 2A from sleep mode to being able to capture a image data using the IMC system 210, according to various embodiments. For added clarity, the flow diagram 220 is segregated into a user interface layer 161, an application layer 162, and a hardware layer 163.

The user interface layer 161 includes portions of the flow diagram 220 involving user interactions with hardware UI components 105. The application layer 162 includes portions of the flow diagram 220 performed by the application processor 190 (e.g., executable by application software). The hardware layer 163 includes portions of the flow diagram 220 performed by hardware components other than the UI components 105 and the application processor 190.

It is assumed that the flow diagram 220 begins when the PPED 200 is locked, such that any components that are not always-on hardware components are powered down, powered off, or otherwise in sleep mode. As described herein, in accordance with the novel PPED architecture, the IMC system 210 and one or more IMC trigger components 205 are implemented as always-on components. As such, the flow diagram 220 can begin with an interaction captured by one of the IMC trigger components 205, and the interaction can directly generate a capture signal 129 to trigger image and/or video capture by the IMC system 210. In some embodiments, the captured image data can be pretreated for communication to the application processor 190. For example, the signals can be pretreated for communication, via the SPI 235, to the AO region 240 of the application processor 190. An application running in the AO region 240 can process the received data and can interface with memory 150, as needed.

For example, suppose an individual is carrying a locked smartphone and sees something that the individual wishes to quickly capture on camera. With a typical conventional smartphone, the individual would (a) interface with the smartphone to unlock the smartphone, (b) wait for the display to wake up and become active, (c) interface again with the smartphone to locate and select a camera application icon, (d) wait for the camera application to startup and wake up the camera components, and (e) interface yet again with the smartphone to point the camera in the desired direction and trigger image capture via the camera application. With the novel PPED architecture described herein, the individual can simply point the IMC system 210 camera in the desired direction and interface with the IMC trigger components 205 to trigger image capture.

As illustrated, some embodiments permit additional functions to be triggered by interaction with the IMC trigger components 205. In some such embodiments, while the IMC system 210 is capturing image data, some implementations can, in parallel, begin to wake up sleeping portions of the application processor 190, display components 125, illumination components 135, etc. For example, when an individual first captures an image (or begins to capture a video) with the IMC system 210 by interfacing with an IMC trigger component 205, the individual may be operating "blind"; the individual may be capturing the image or video without visual feedback, for example, from a viewfinder. In the meantime, however, the application processor 190 and display components 125 are waking up, such that visual feedback begins to be available shortly thereafter. In such implementations, for example, a first picture (or first few pictures in rapid succession, or first second or two of a video) may be captured without visual feedback assistance; after which the individual can continue capturing images or video with visual feedback assistance (e.g., thereby permitting the individual to dynamically correct pointing, lighting, zoom, etc.).

In some embodiments, the IMC MCU 215 dynamically controls capture of image data by the IMC system 210 in response to the IMC trigger components 205. For example, the IMC MCU 215 can control operation of optical components for focus, lighting, tracking, image stabilization, and/or other image capture settings. For example, the IMC MCU 215 can detect lighting, moving objects and/or objects of interest in the field of view, and/or the like, and can dynamically adjust image capture settings, accordingly. Additionally or alternatively, some embodiments operate according to default settings and/or user-configurable image capture settings. For example, a user can configure IMC settings, such as lighting defaults, zoom defaults, aperture defaults, resolution defaults, and/or any other suitable settings. In some embodiments, the image capture settings are stored in a memory of the IMC MCU 215 (not explicitly shown).

Figure 3A:
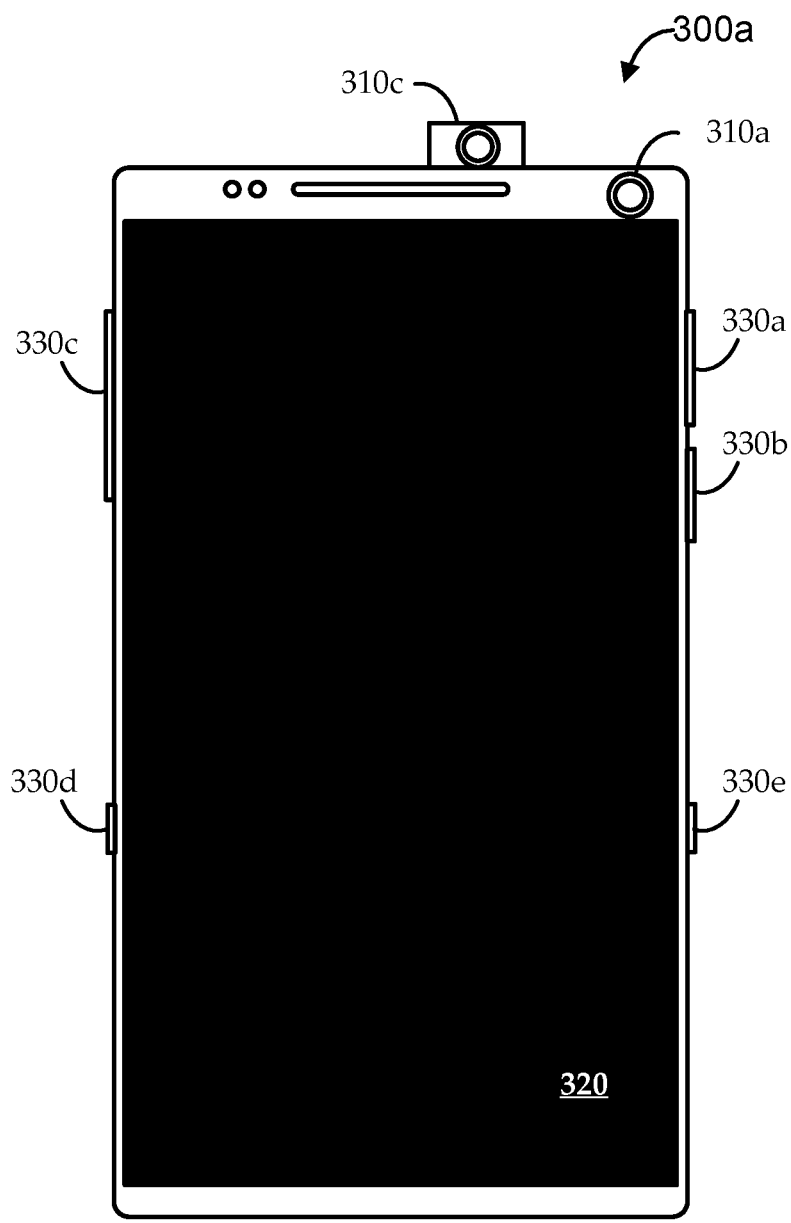
FIGS. 3A and 3B show front and side views, respectively, of an illustrative PPED, according to various embodiments.
Figure 3B:
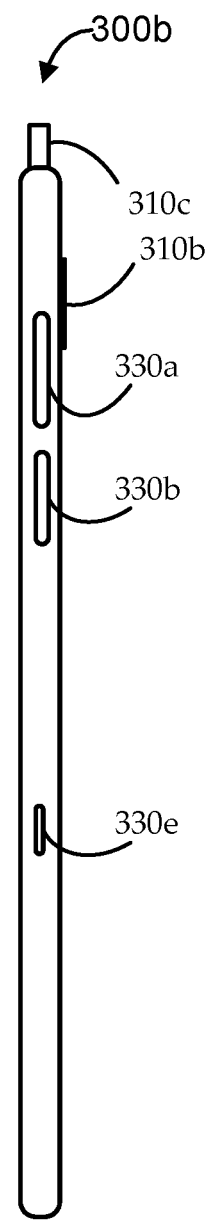

FIGS. 3A and 3B show front and side views, respectively, of an illustrative portable personal electronic device (PPED) 300, according to various embodiments. The PPED 300 can be implemented as a smartphone (e.g., or a laptop computer, tablet computer, wearable device, etc.) with one or more integrated digital cameras 310. For example, as illustrated, the PPED 300 can include a front-facing (e.g., selfie) camera 310a, a rear-facing camera 310b (shown in FIG. 3B), a pop-out camera 310c, and/or any other suitable integrated cameras 310. At least one of the integrated cameras 310 is implemented as an immediate-mode camera, such as the IMC system 210 described with reference to FIG. 2A.

Embodiments of the PPED 300 can also include user interface components (e.g., the UI components 105 of FIG. 2A). Some embodiments include one or more displays 320. Though not explicitly shown, some embodiments of the display 320 can have, integrated therewith, capacitive touchscreen elements, another digital camera 310, a fingerprint sensor, and/or other components. The user interface components can also include one or more physical buttons 330. For example, the physical buttons 330 can include a power button, volume buttons, etc. In some implementations, one or more of the buttons is dedicated to a particular function, and one or more of the buttons is dynamically assignable (e.g., by the application processor 190 and/or other components) to various functions. For example, in context of operating a conventional (non-IMC) digital camera, a particular button can trigger image acquisition while the camera application is running in the foreground, while the same button can have other functions while other applications are running in the foreground. Though not shown, the PPED 300 can include additional user interface components, such as optical sensors, force sensors, biometric sensors, accelerometers, etc.

As described above, certain of the user interface components can be configured as always-on components, such that they can respond to user interactions even while the PPED 300 is locked. Some or all such always-on user interface components can be configured as the IMC trigger components 205 of FIG. 2A, such that interaction with those components can directly trigger image capture by an IMC camera integrated into the PPED 300. In some embodiments, one or more of the physical buttons 330 is configured as a IMC trigger component 205. In some such embodiments, the physical button(s) 330 can be coupled (e.g., directly via a hardware connection) with the IMC MCU 215 of the IMC system 210. In one implementation, a single physical button (e.g., button 330d, button 330e, etc.) automatically triggers capture of a photo using the IMC system 210 (e.g., using camera 310b). In another implementation, one physical button (e.g., button 330d) automatically triggers capture of a photo using the IMC system 210, and another physical button (e.g., button 330e) automatically triggers capture of a video using the IMC system 210. In another implementation, concurrently depressing multiple physical buttons (e.g., pressing button 330d and button 330e together) automatically triggers capture of a photo using the IMC system 210. In another implementation, depressing one or more physical buttons for at least a predetermined amount of time (e.g., holding down button 330d for a half-second) automatically triggers capture of a photo using the IMC system 210.

Figure 4C:
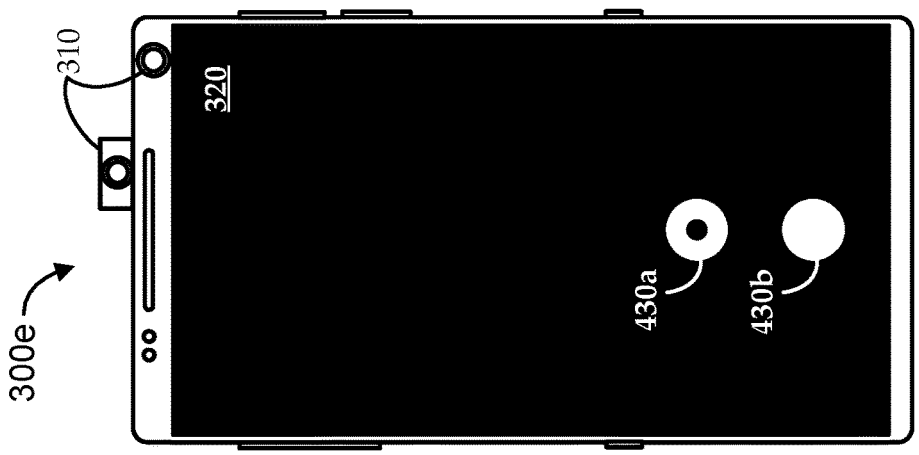
FIGS. 4A-4C show illustrative implementations of PPEDs with various types of IMC trigger components, according to various embodiments.
Figure 4B:
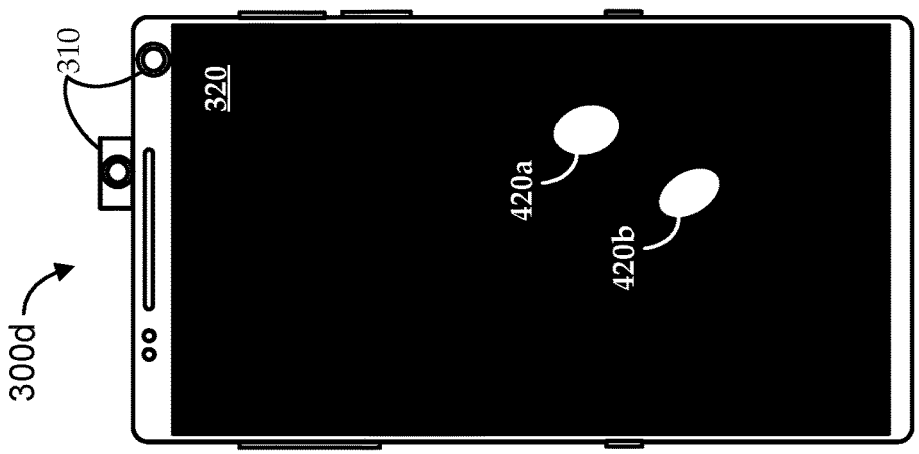
Figure 4A:
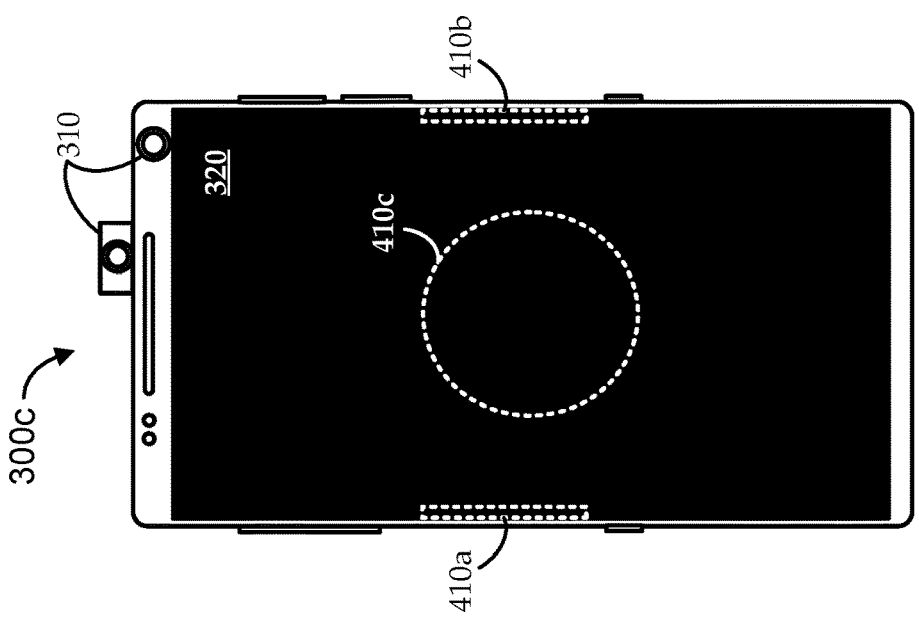

FIGS. 4A-4C show illustrative implementations of PPEDs 300 with various types of IMC trigger components, according to various embodiments. Turning first to FIG. 4A, a PPED 300c is shown with one or more integrated force sensors 410, configured as IMC trigger components. In some such embodiments, the force sensors 410 can be coupled (e.g., directly via a hardware connection) with the IMC MCU 215 of the IMC system 210. For example, each of one or more force sensors 410 can detect when a user squeezes the PPED 300c, or otherwise applies at least a certain amount of force on the PPED 300c in the location of the force sensors 410, and can trigger capture of a photo or video using the IMC system 210 in response thereto. In various implementations, the IMC system 210 can be triggered by applying force to a particular one of the force sensors 410, concurrently to multiple force sensors 410, to one or more force sensors 410 for at least a predetermine amount of time, to one or more force sensors 410 in accordance with a predefined pattern, etc.

Turning to FIG. 4B, a PPED 300d is shown with touch sensors integrated into the display (e.g., as part of a capacitive touchscreen), and the touch sensors are usable as IMC trigger components. In some such embodiments, some or all of the force sensors can be coupled (e.g., directly via a hardware connection) with the IMC MCU 215 of the IMC system 210. For example, user interaction with one or more touch locations or patterns 420 can trigger capture of a photo or video using the IMC system 210 in response thereto. In various implementations, the IMC system 210 can be triggered by touching one or more particular locations concurrently, touching one or more particular locations in a particular order or pattern, tracing out a particular pattern across the touch sensors, etc.

Turning to FIG. 4C, a PPED 300e is shown with secondarily activated touch sensor locations implemented via the display (e.g., as part of a capacitive touchscreen) and usable as IMC trigger components. In response to the user interacting with one or more IMC trigger components (e.g., buttons, force sensors, touch sensors, etc.), a set of touch regions 430 becomes active. For example, a first touch region 430a becomes actively associated with video capture, such that subsequent user interaction with the first touch region 430a can trigger capture of a video using the IMC system 210; and a second touch region 430b becomes actively associated with photo capture, such that subsequent user interaction with the second touch region 430b can trigger capture of a photo using the IMC system 210. In some implementations, activation of the touch regions 430 can involve outputting a predefined image to the display showing indications of the touch regions 430. In other implementations, no visual or other indication is provided. For example, the regions are separated by enough distance (e.g., the first touch region 430a being the entire top-third of the display, and the second touch region 430b being the entire bottom third of the display), so that a user can reliably interact with the desired touch region 430 without visual cues.

Additionally or alternatively, embodiments of PPEDs 300 can include other types of IMC trigger components 205. In one such embodiment, photo and/or video capture by the IMC system 210 is triggered by the IMC system 210 first capturing a predetermined image or video. For example, as the IMC system 210 is an always-on component, it can be configured automatically to respond to detection of a predetermined gesture, facial expression, etc. In another such embodiment, photo and/or video capture by the IMC system 210 is triggered by an audio input received by a microphone. For example, a predetermined audio command, recognition of a particular voice signature, or other audio data can trigger image or video capture. In another such embodiment, photo and/or video capture by the IMC system 210 is triggered by moving the PPED 300 in a predetermined manner (e.g., detected by a gyroscopic sensor, an accelerometer, etc.). For example, shaking, rotating, waving, or otherwise moving the PPED 300 can trigger image or video capture.

In some embodiments, the PPED 300 can indicate one or more aspects of IMC system 210 operation. In some such embodiments, capture of image or video using the IMC system 210 can trigger an audio response, such as a sound of a camera shutter, a ding, or any other suitable audio feedback. In other such embodiments, capture of image or video using the IMC system 210 can trigger a visual response, such as output of a predetermined image to the display. For example, during photo or video capture, or in response to successful photo or video capture, the display can show a graphic (e.g., an image of a camera), text (e.g., "IMC photo!"), and/or any other visual indication. In some implementations, certain display components 125 can be implemented for always-on operation, such as to permit display of a pre-generated image (e.g., a lock screen, an IMC-related graphic, etc.). In other implementations, the display components 125 can be triggered to wake up in parallel with image or video capture by the IMC system 210, such that the display is ready to output content by the time the image or video is captured (or shortly thereafter).

Figure 5:
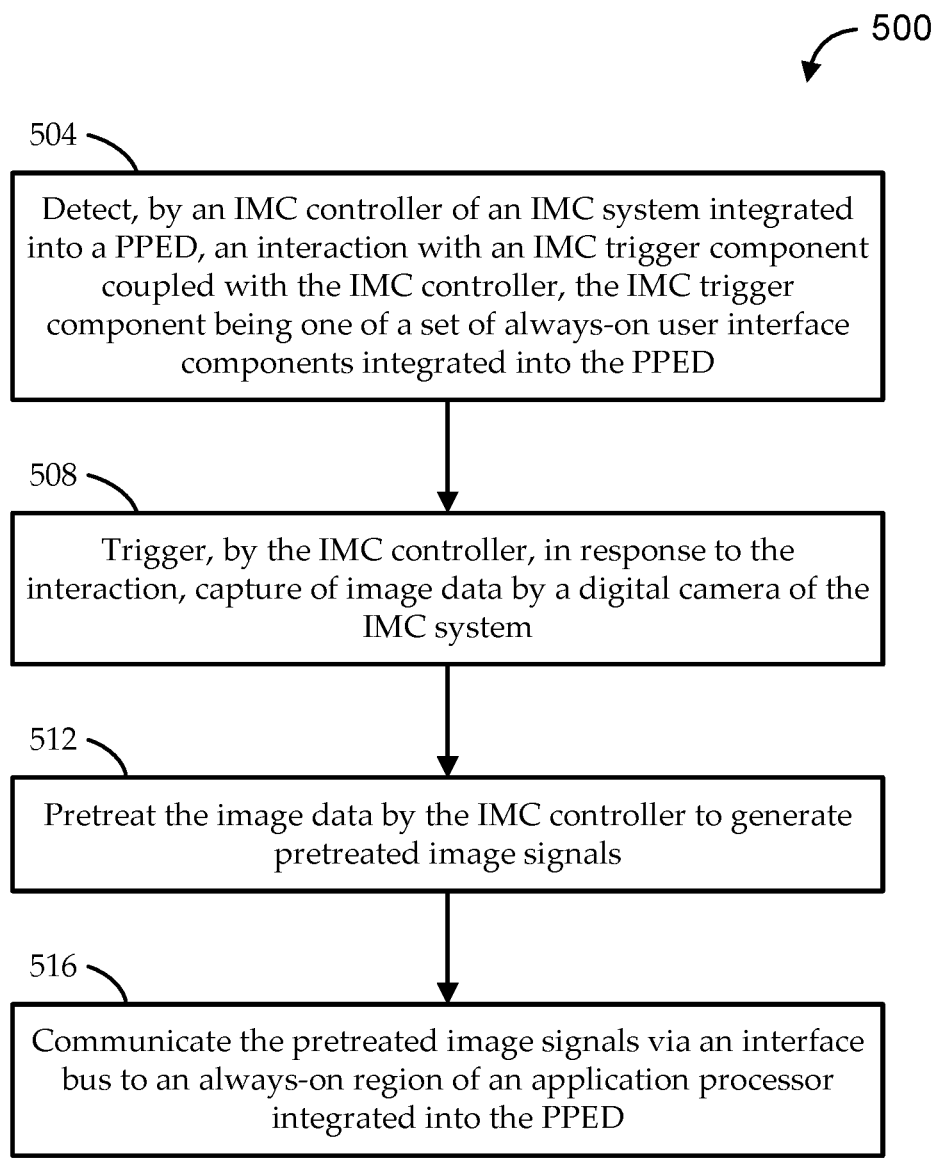
FIG. 5 shows a flow diagram of an illustrative method for immediate-mode digital image capture, according to various embodiments.

FIG. 5 shows a flow diagram of an illustrative method 500 for immediate-mode digital image capture, according to various embodiments. Embodiments of the method 500 can operate in context of an immediate-mode camera (IMC) system of a portable personal electronic device (PPED), such as those described above with reference to FIGS. 2A-4C. Embodiments of the method 500 can begin at stage 504 by detecting, by an IMC controller of an IMC system integrated into a PPED, an interaction with an IMC trigger component. The IMC trigger component is coupled with the IMC controller and is one of a set of always-on user interface components integrated into the PPED. For example, the IMC trigger component is a physical button, a force sensor, a touch sensor, etc. In some embodiments, the detecting at stage 504 includes detecting concurrent interaction with a plurality of IMC trigger components (e.g., pressing two physical buttons at substantially the same time). In other embodiments, the detecting at stage 504 includes detecting a predetermined pattern of interaction with one or more IMC trigger components (e.g., tapping a certain number of times and/or in a certain rhythm, swiping along a certain path, etc.).

At stage 508, embodiments can trigger, by the IMC controller, in response to the interaction at stage 504, capture of image data by a digital camera of the IMC system. In some embodiments, the detecting at stage 504 is performed while the application processor is in a sleep mode (e.g., the PPED is locked). In some such embodiments, the detecting at stage 504 and the triggering at stage 508 can be performed without waking the application processor out of the sleep mode (e.g., without unlocking the PPED). In other such embodiments, the method 500 can further trigger, by the IMC controller, in response to the interaction, in parallel with triggering the capture of the image data (e.g., at the same time, in close temporal proximity to, etc.), wakeup of the application processor from the sleep mode. For example, even though the capture of the image data and the waking of the application occur in parallel, the capture of the image data can occur prior to completing wakeup of the application processor.

In some embodiments, the IMC controller is in communication with a memory having, stored thereon prior to the detecting, image capture settings. In such embodiments, the triggering at stage 508 can be such that the capture of the image data is in accordance with the image capture settings (e.g., the image data is captured automatically in accordance with preset defaults). In other such embodiments, prior to the detecting, the method 500 can include receiving user interactions indicating a user configuration of one or more of the image capture settings; and updating the one or more of the image capture settings in the memory, by the IMC controller, responsive to and in accordance with the user interactions.

At stage 512, embodiments can pretreat the image data by the IMC controller to generate pretreated image signals. At stage 516, embodiments can communicate the pretreated image signals via an interface bus to an always-on region of an application processor integrated into the PPED. For example, the image data can be pretreated for communication via a specific implementation of interface bus, such as a serial peripheral interface. In some embodiments, the application processor has, implemented thereon, a trusted execution environment, and the trusted execution environment has the always-on region implemented therein.

It will be understood that, when an element or component is referred to herein as "connected to" or "coupled to" another element or component, it can be connected or coupled to the other element or component, or intervening elements or components may also be present. In contrast, when an element or component is referred to as being "directly connected to," or "directly coupled to" another element or component, there are no intervening elements or components present between them. It will be understood that, although the terms "first," "second," "third," etc. may be used herein to describe various elements, components, these elements, components, regions, should not be limited by these terms. These terms are only used to distinguish one element, component, from another element, component. Thus, a first element. component, discussed below could be termed a second element, component, without departing from the teachings of the present invention. As used herein, the terms "logic low," "low state," "low level," "logic low level," "low," or "0" are used interchangeably. The terms "logic high," "high state," "high level," "logic high level," "high," or "1" are used interchangeably.

As used herein, the terms "a", "an" and "the" may include singular and plural references. It will be further understood that the terms "comprising", "including", having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components. Furthermore, as used herein, the words "and/or" may refer to and encompass any possible combinations of one or more of the associated listed items.

While the present invention is described herein with reference to illustrative embodiments, this description is not intended to be construed in a limiting sense. Rather, the purpose of the illustrative embodiments is to make the spirit of the present invention be better understood by those skilled in the art. In order not to obscure the scope of the invention, many details of well-known processes and manufacturing techniques are omitted. Various modifications of the illustrative embodiments, as well as other embodiments, will be apparent to those of skill in the art upon reference to the description. It is therefore intended that the appended claims encompass any such modifications.

Furthermore, some of the features of the preferred embodiments of the present invention could be used to advantage without the corresponding use of other features. As such, the foregoing description should be considered as merely illustrative of the principles of the invention, and not in limitation thereof. Those of skill in the art will appreciate variations of the above-described embodiments that fall within the scope of the invention. As a result, the invention is not limited to the specific embodiments and illustrations discussed above, but by the following claims and their equivalents.

What is claimed is:

1. An immediate-mode camera (IMC) system for integration in a portable personal electronic device (PPED), the IMC system comprising:
   an IMC controller configured to:
   detect an interaction with an IMC trigger component that is an always-on user interface component of the PPED while an application controller of the PPED is in a sleep mode;
   trigger, responsive to detecting the interaction, capture of image data by a digital camera assembly of the PPED; and
   communicate the image data via an interface bus to an always-on region of the application controller that remains active when the application controller is in the sleep mode.

2. The IMC system of claim 1, wherein:
   the IMC controller is further configured to pretreat the image data to generate pretreated image signals; and
   the IMC controller is configured to communicate the image data by communicating the pretreated image signals via the interface bus.

3. The IMC system of claim 1, further comprising:
   a memory coupled with the IMC controller and having, stored thereon, image capture settings,
   wherein the IMC controller is to perform the triggering such that the capture of the image data is in accordance with the image capture settings.

4. The IMC system of claim 3, wherein the triggering directs focusing of the digital camera assembly prior to the capture of the image data automatically in accordance with the image capture settings.

5. The IMC system of claim 3, wherein the triggering directs activation of one or more illumination sources of the PPED associated with the capture of the image data automatically in accordance with the image capture settings.

6. The IMC system of claim 3, wherein:
the digital camera assembly comprises a plurality of cameras; and
the triggering directs the capture of the image data by a selected one of the plurality of cameras automatically in accordance with the image capture settings.

7. The IMC system of claim 3, wherein the image capture settings comprise settings for at least one of tracking or image stabilization.

8. The IMC system of claim 3, wherein the IMC controller is further to:
receive instructions indicating user interactions with the PPED indicating user configuration of the image capture settings; and
update the image capture settings in the memory responsive to and in accordance with the instructions.

9. The IMC system of claim 1, wherein the IMC controller is configured to:
couple with a hardware interface block of the PPED via a serial peripheral interface (SPI) of the hardware interface; and
perform the triggering by communicating a trigger signal to the digital camera assembly via the SPI.

10. The IMC system of claim 1, wherein the IMC controller is directly coupled with the trigger component via a hardware coupling.

11. The IMC system of claim 1, wherein the IMC controller is to perform the detecting and the triggering without waking the application controller out of the sleep mode.

12. The IMC system of claim 1, wherein the IMC controller is further configured to:
trigger, in parallel with triggering the capture of the image data, wakeup of the application controller from the sleep mode.

13. The IMC system of claim 1, wherein the IMC controller is further configured to:
determine whether the application controller of the PPED is in a sleep mode,
wherein the IMC controller performs the triggering and the communicating only when the application controller of the PPED is determined to be in the sleep mode.

14. The IMC system of claim 1, wherein the IMC controller is further configured to:
trigger, in parallel with triggering the capture of the image data, wakeup of a display system of the PPED, the display system configured to display a viewfinder to assist with subsequent image capture by the digital camera assembly of the PPED.

15. The IMC system of claim 1, wherein the IMC controller is further configured to:
trigger, in parallel with triggering the capture of the image data, wakeup of an illumination system of the PPED, the illumination subsystem configured to support image capture by the digital camera assembly of the PPED.

16. The IMC system of claim 1, wherein the triggering the capture of the image data triggers capturing of video data comprising a plurality of image frames.

17. The IMC system of claim 1, further comprising:
at least a portion of the IMC trigger component, the IMC trigger component implemented as a physical button of the PPED.

18. The IMC system of claim 1, further comprising:
at least a portion of the IMC trigger component, the IMC trigger component implemented as at least one of a force sensor, a touch sensor.

19. The IMC system of claim 1, wherein the always-on region of the application controller is implemented in a trusted execution environment.

* * * * *